(12) United States Patent
Nebeker et al.

(10) Patent No.: US 6,972,769 B1
(45) Date of Patent: Dec. 6, 2005

(54) VERTEX TEXTURE CACHE RETURNING HITS OUT OF ORDER

(75) Inventors: Jakob Nebeker, San Jose, CA (US); Jeffrey B. Moskal, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 28 days.

(21) Appl. No.: 10/934,120

(22) Filed: Sep. 2, 2004

(51) Int. Cl.$^7$ ............................................. G06T 11/40
(52) U.S. Cl. ........................ 345/552; 345/557; 345/582
(58) Field of Search ................................ 345/418–422, 345/582, 505, 501–503, 506, 530, 531, 545, 345/581, 552, 557, 564, 556; 711/118, 126, 711/131, 144

(56) References Cited

U.S. PATENT DOCUMENTS

| | | | | |
|---|---|---|---|---|
| 5,831,640 A | * | 11/1998 | Wang et al. ................. | 345/552 |
| 5,856,829 A | * | 1/1999 | Gray et al. .................. | 345/419 |
| 6,650,327 B1 | * | 11/2003 | Airey et al. ................. | 345/422 |
| 2004/0155884 A1 | * | 8/2004 | Baker et al. ................. | 345/552 |

* cited by examiner

*Primary Examiner*—Kee M. Tung
(74) *Attorney, Agent, or Firm*—Townsend and Townsend and Crew LLP; Ko-Fang Chang (57) ABSTRACT

A vertex texture cache unit enables vertex shader programs to arbitrarily access array data while minimizing pipeline stalls due to memory latency. The vertex texture cache unit receives vertex texture requests from multiple vertex processing engines, each executing multiple vertex shader programs. The vertex texture cache unit stores frequently accessed vertex texture map data in a cache memory. When a cache miss occurs, the vertex texture cache unit continues to process subsequent vertex texture requests while data is being retrieved from memory for the cache miss. Because the vertex texture cache unit may output vertex texture map data in a different order than the corresponding vertex texture requests are received, the vertex texture cache unit maintains the association between vertex texture map data and its set of attributes, so that the vertex texture map data is formatted correctly and returned to the appropriate vertex processing engine and vertex shader program.

25 Claims, 5 Drawing Sheets

VERTEX TEXTURE CACHE RETURNING HITS OUT OF ORDER

CROSS-REFERENCES TO RELATED APPLICATIONS

This application is being filed concurrently with U.S. application Ser. No. 10/935,119, entitled "VERTEX PROCESSING UNIT SUPPORTING VERTEX TEXTURE MAPPING," filed Sep. 2, 2004 by Jeffrey B. Moskal, David C. Tannenbaum, Andrew D. Bowen, and Jakob Nebeker, the disclosure of which is incorporated herein by reference.

BACKGROUND OF THE INVENTION

The present invention relates to the field of computer graphics. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene.

As the demand for computer graphics, and in particular for real-time computer graphics, has increased, computer systems with graphics processing subsystems adapted to accelerate the rendering process have become widespread. In these computer systems, the rendering process is divided between a computer's general purpose central processing unit (CPU) and the graphics processing subsystem. Typically, the CPU performs high level operations, such as determining the position, motion, and collision of objects in a given scene. From these high level operations, the CPU generates a set of rendering commands and data defining the desired rendered image or images. For example, rendering commands and data can define scene geometry, lighting, shading, texturing, motion, and/or camera parameters for a scene. The graphics processing subsystem creates one or more rendered images from the set of rendering commands and data.

Scene geometry is typically represented by geometric primitives, such as points, lines, polygons (for example, triangles and quadrilaterals), and curved surfaces, defined by one or more two- or three-dimensional vertices. Each vertex may have additional scalar or vector attributes used to determine qualities such as the color, transparency, lighting, shading, and animation of the vertex and its associated geometric primitives.

Many graphics processing subsystems are highly programmable, enabling implementation of, among other things, complicated lighting and shading algorithms. In order to exploit this programmability, applications can include one or more graphics processing subsystem programs, which are executed by the graphics processing subsystem in parallel with a main program executed by the CPU. Although not confined to merely implementing shading and lighting algorithms, these graphics processing subsystem programs are often referred to as shading programs or shaders.

One portion of a typical graphics processing subsystem is a vertex processing unit. To enable a variety of per-vertex algorithms, for example for visual effects, the vertex processing unit is highly programmable. The vertex processing unit executes one or more vertex shader programs in parallel with the main CPU. While executing, each vertex shader program successively processes vertices and their associated attributes to implement the desired algorithms. Additionally, vertex shader programs can be used to transform vertices to a coordinate space suitable for rendering, for example a screen space coordinate system. Vertex shader programs can implement algorithms using a wide range of mathematical and logical operations on vertices and data, and can includes conditional and branching execution paths.

Unfortunately, vertex shader programs typically cannot arbitrarily access data stored in memory. This prevents vertex shader programs from using of data structures such as arrays. Using scalar or vector data stored in arrays enables vertex shader programs to perform a variety of additional per-vertex algorithms, including but not limited to advanced lighting effects, geometry effects such as displacement mapping, and complex particle motion simulations. Arrays of data could also be used to implement per-vertex algorithms that are impossible, unpractical, or inefficient to implement otherwise.

One barrier to allowing vertex shader programs to arbitrarily access data in memory is that arbitrary memory accesses typically have large latencies, especially when accessing external memory. When the vertex processing unit must stop vertex shader program execution until data is returned from memory, which is referred to as a pipeline stall, the performance is severely decreased.

One way to reduce the frequency of pipeline stalls due to memory latency is to use a cache memory to store a copy of frequently accessed data. However, typical arrays used to store data for per-vertex algorithms are too large to be cached entirely. Additionally, if the data requested by a vertex shader program is not in the cache memory, a situation referred to as a cache miss, then a pipeline stall will occur as the requested data is fetched from memory. Moreover, for increased performance, a vertex processing unit may be capable of executing multiple vertex shader programs in parallel. In this implementation, multiple data requests from vertex shader programs executing in parallel can quickly overwhelm a cache memory. Additionally, a cache miss from one vertex shader program can cause a pipeline stall for all of the vertex shader programs executing in parallel.

It is therefore desirable for a vertex processing unit of a graphics processing subsystem to enable vertex shader programs to arbitrarily access array data while minimizing pipeline stalls due to memory latency. It is further desirable that the vertex processing unit efficiently process data requests from multiple vertex shader programs executing in parallel.

BRIEF SUMMARY OF THE INVENTION

An embodiment of the invention is a graphics processing unit having a vertex texture cache unit that enables vertex shader programs to arbitrarily access array data while minimizing pipeline stalls due to memory latency. The vertex texture cache unit receives vertex texture requests from a number of vertex processing engines, each executing multiple vertex shader programs. The vertex texture cache unit stores frequently accessed vertex texture map data in a cache memory. When a cache miss occurs, the vertex texture cache unit continues to process subsequent vertex texture requests while data is being retrieved from memory for the cache miss. Because the vertex texture cache unit may output vertex texture map data in a different order than the corresponding vertex texture requests are received, the vertex texture cache unit maintains the association between vertex texture map data and its set of attributes, so that the vertex texture map data is formatted correctly and returned to the appropriate vertex processing engine and vertex shader program.

In an embodiment, a graphics processing subsystem comprising a vertex texture fetch unit adapted to receive a series of vertex texture requests from at least one vertex processing engine. Each vertex texture request including a vertex texture ID specifying a vertex texture map and at least one index value specifying a location of vertex texture map data within the vertex texture map. The vertex texture fetch unit includes a sample unit adapted to compute a memory address for each vertex texture request. The memory address corresponds to the location of the vertex texture map data within a graphics memory.

The vertex texture fetch unit also includes a vertex texture cache unit. The vertex texture cache unit includes a vertex texture cache memory adapted to store a copy of at least a portion of at least one vertex texture map. The vertex texture cache unit adapted to request the vertex texture map data specified by a first one of the series of vertex texture requests from the location in the graphics memory corresponding with the memory address in response to a determination by the vertex texture cache unit that a vertex texture cache memory is not storing a copy of the vertex texture map data. While the request for vertex texture map data specified by a first one of the series of vertex texture requests from the graphics memory is pending, the vertex texture cache unit is adapted to output a vertex texture map data corresponding with a second one of the series of vertex texture requests.

In an additional embodiment, the vertex texture cache unit is adapted to output the vertex texture map data corresponding with a second one of the series of vertex texture requests in response to the vertex texture cache memory having stored a copy of the vertex texture map data corresponding with a second one of the series of vertex texture requests.

In another embodiment, the vertex texture cache unit is adapted to output the vertex texture map data corresponding with the second one of the series of vertex texture requests in response to receiving the vertex texture map data corresponding with a second one of the series of vertex texture requests from the graphics memory. The vertex texture cache unit is further adapted to match the received vertex texture map data with a set of attributes included with the second one of the series of vertex texture requests. In a further embodiment, the vertex texture cache unit includes a miss queue adapted to store a set of attributes included with the second one of the series of vertex texture requests while a request for the vertex texture map data corresponding with the second one of the series of vertex texture requests is pending.

BRIEF DESCRIPTION OF THE DRAWINGS

In the drawings, the use of identical reference numbers indicates identical components.

DETAILED DESCRIPTION OF THE INVENTION

Figure 1:
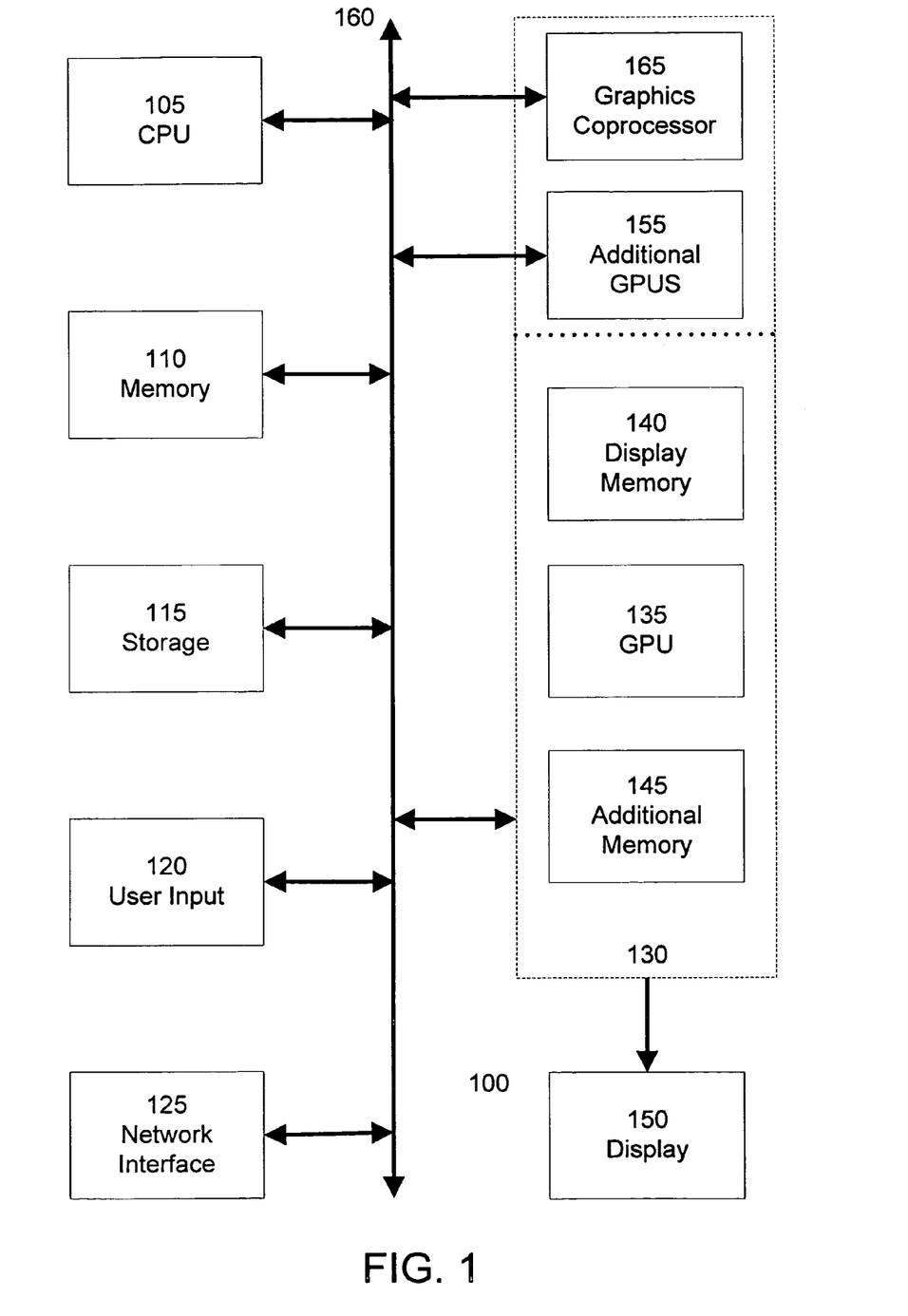
FIG. 1 is a block diagram of an example computer system suitable for implementing an embodiment of the invention.

FIG. 1 is a block diagram of a computer system 100, such as a personal computer, video game console, personal digital assistant, or other digital device, suitable for practicing an embodiment of the invention. Computer system 100 includes a central processing unit (CPU) 105 for running software applications and optionally an operating system. In an embodiment, CPU 105 is actually several separate central processing units operating in parallel. Memory 110 stores applications and data for use by the CPU 105. Storage 115 provides non-volatile storage for applications and data and may include fixed disk drives, removable disk drives, flash memory devices, and CD-ROM, DVD-ROM, or other optical storage devices. User input devices 120 communicate user inputs from one or more users to the computer system 100 and may include keyboards, mice, joysticks, touch screens, and/or microphones. Network interface 125 allows computer system 100 to communicate with other computer systems via an electronic communications network, and may include wired or wireless communication over local area networks and wide area networks such as the Internet. The components of computer system 100, including CPU 105, memory 110, data storage 115, user input devices 120, and network interface 125, are connected via one or more data buses 160. Examples of data buses include ISA, PCI, AGP, PCI, PCI-Express, and HyperTransport data buses.

A graphics subsystem 130 is further connected with data bus 160 and the components of the computer system 100. The graphics subsystem may be integrated with the computer system motherboard or on a separate circuit board fixedly or removably connected with the computer system. The graphics subsystem 130 includes a graphics processing unit (GPU) 135 and graphics memory. Graphics memory includes a display memory 140 (e.g., a frame buffer) used for storing pixel data for each pixel of an output image. Pixel data can be provided to display memory 140 directly from the CPU 105. Alternatively, CPU 105 provides the GPU 135 with data and/or commands defining the desired output images, from which the GPU 135 generates the pixel data of one or more output images. The data and/or commands defining the desired output images is stored in additional memory 145. In an embodiment, the GPU 135 generates pixel data for output images from rendering commands and data defining the geometry, lighting, shading, texturing, motion, and/or camera parameters for a scene.

In another embodiment, display memory 140 and/or additional memory 145 are part of memory 110 and is shared with the CPU 105. Alternatively, display memory 140 and/or additional memory 145 is one or more separate memories provided for the exclusive use of the graphics subsystem 130. The graphics subsystem 130 periodically outputs pixel data for an image from display memory 140 and displayed on display device 150. Display device 150 is any device capable of displaying visual information in response to a signal from the computer system 100, including CRT, LCD, plasma, and OLED displays. Computer system 100 can provide the display device 150 with an analog or digital signal.

In a further embodiment, graphics processing subsystem 130 includes one or more additional GPUs 155, similar to GPU 135. In an even further embodiment, graphics processing subsystem 130 includes a graphics coprocessor 165. Graphics processing coprocessor 165 and additional GPUs 155 are adapted to operate in parallel with GPU 135, or in place of GPU 135. Additional GPUs 155 generate pixel data for output images from rendering commands, similar to GPU 135. Additional GPUs 155 can operate in conjunction with GPU 135 to simultaneously generate pixel data for different portions of an output image, or to simultaneously generate pixel data for different output images. In an embodiment, graphics coprocessor 165 performs rendering related tasks such as geometry transformation, shader computations, and backface culling operations for GPU 135 and/or additional GPUs 155.

Additional GPUs 155 can be located on the same circuit board as GPU 135 and sharing a connection with GPU 135 to data bus 160, or can be located on additional circuit boards separately connected with data bus 160. Additional GPUs 155 can also be integrated into the same module or chip package as GPU 135. Additional GPUs 155 can have their own display and additional memory, similar to display memory 140 and additional memory 145, or can share memories 140 and 145 with GPU 135. In an embodiment, the graphics coprocessor 165 is integrated with the computer system chipset (not shown), such as with the Northbridge or Southbridge chip used to control the data bus 160.

Figure 2:
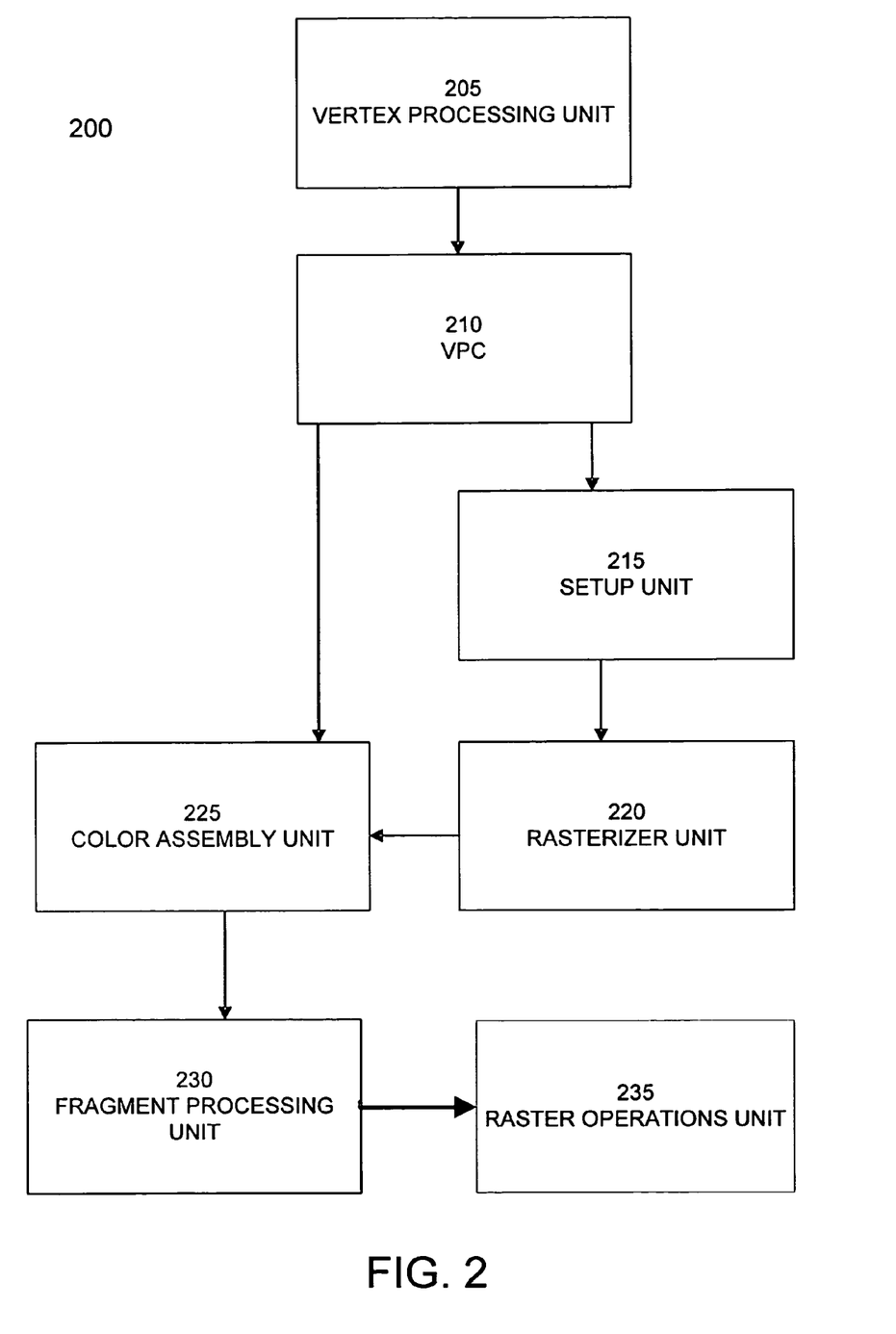
FIG. 2 illustrates a block diagram of a rendering pipeline of a graphics processing subsystem according to an embodiment of the invention.

FIG. 2 illustrates a block diagram of a rendering pipeline 200 of a graphics processing subsystem according to an embodiment of the invention. Pipeline 200 may be implemented in GPU 135 and/or described above. Pipeline 200 includes a vertex processing unit 205, a viewport and culling (VPC) unit 210, a setup unit 215, a rasterizer unit 220, a color assembly block 225, and a fragment processing unit 230.

Vertex processing unit 205, which may be of generally conventional design, receives a geometric representation of a three-dimensional scene to be rendered. In one embodiment, the scene data includes a definitions for objects (e.g., a table, a mountain, a person, or a tree) that may be present in the scene. Objects typically represented as one or more geometric primitives, such as points, lines, polygons (for example, triangles and quadrilaterals), and curved surfaces. Geometric primitives are typically defined by one or more vertices, each having a position that is typically expressed in a two- or three-dimensional coordinate system. In addition to a position, each vertex also has various attributes associated with it. In general, attributes of a vertex may include any property that is specified on a per-vertex basis. In an embodiment, the vertex attributes include scalar or vector attributes used to determine qualities such as the color, transparency, lighting, shading, and animation of the vertex and its associated geometric primitives.

It is typically more convenient to express and manipulate portions of the three-dimensional scene in different coordinate systems. For example, each object may have one or more local coordinate systems. Because objects may have their own coordinate systems, additional data or commands are advantageously provided to position the objects relative to each other within a scene, for example with reference to global coordinate system. Additionally, rendering may be performed by transforming all or portions of a scene from a global coordinate system to a viewport or screen-space coordinate system. In an embodiment, the vertex processing unit 205 transforms vertices from their base position in a local coordinate system through one or more frames of reference to a destination coordinate system, such as a global or screen space coordinate system. In a further embodiment, vertices are specified using a homogeneous coordinate system to facilitate coordinate transformations by the vertex processing unit 205.

Additionally, as discussed in more detail below, the vertex processing unit is highly programmable and can execute vertex shader programs specified by the rendering application. While executing, each vertex shader program successively processes vertices and their associated attributes to implement a variety of visual effects. Numerous examples of such "per-vertex" operations are known in the art and a detailed description is omitted as not being critical to understanding the present invention. Vertex shader programs can implement algorithms using a wide range of mathematical and logical operations on vertices and data, and can includes conditional and branching execution paths.

In addition to performing mathematical and logical operations on vertices, vertex shader programs can arbitrarily access memory to retrieve additional scalar or vector data stored in an array. Vertex shader programs can use the array data to enable vertex shader programs to perform a variety of additional per-vertex algorithms, including but not limited to advanced lighting effects, geometry effects such as displacement mapping, and complex particle motion simulations. Vertex shader programs can also use arrays of data to implement per-vertex algorithms that are impossible, unpractical, or inefficient to implement otherwise.

In the most simple implementation, the data elements of a one- or two-dimensional array are associated with vertices based upon the vertices' positions. For this reason, an array of data associated with one or more vertices is typically referred to as a vertex texture map. However, the term vertex texture map also includes arrays of scalar or vector data of any size and number of dimensions and associated with vertices in any arbitrary way. Unlike texture maps associated with pixels, vertex texture maps do not specify the color, transparency, or other attributes of individual pixels; rather, vertex texture maps specify the attributes of vertices.

Additionally, multiple vertex texture maps can be associated with a set of vertices, for example, with each vertex texture map supplying different parameters to a vertex shader program. The vertex shader program can use data from multiple vertex texture maps separately, can combine data from multiple vertex texture maps, and can use data from one vertex texture map to specify the location of data in another vertex texture map.

The viewport and culling unit 210 culls or discards geometric primitives and/or portions thereof that are outside the field of view or otherwise unseen in the rendered image. By discarding geometric primitives that are not seen in the rendered image, culling decreases the number of geometric primitives to be processed by downstream processing stages of the rendering pipeline 200 and thus increases rendering speed.

Setup unit 215 assembles one or more vertices into a geometric primitive, such as a triangle or quadrilateral. The rasterization stage 220 then converts each geometric primitive into one or more pixel fragments. A pixel fragment defines a set of one or more pixels to be potentially displayed in the rendered image. Each pixel fragment includes information defining the appearance of its pixels, for example screen position, texture coordinates, color values, and normal vectors.

Color assembly block 225 associates the pixel fragments received from rasterizer 220 with the per-vertex attributes, such as vertex colors, depth values, vertex normal vectors, and texture coordinates, received from VPC block 210 and generates additional attributes for interpolating per-vertex attribute values at any point within the pixel fragments. The pixel fragments and associated attributes are provided to fragment processor 230.

Fragment processor 230 uses the information associated with each pixel fragment to determine the output color value of each pixel to be potentially displayed. Like the vertex processor 205, the fragment processing unit is programmable. A pixel fragment program, also referred to as a pixel shader, is executed on each pixel fragment to determine an output color value for a pixel. Although the pixel fragment program operates independently of the vertex shader program, the pixel fragment program may be dependent upon information created by or passed through previous stream processing units, including information created by a vertex program. Rendering applications can specify the pixel fragment program to be used for any given set of pixel fragments. Pixel fragment programs can be used to implement a variety of visual effects, including lighting and shading effects, reflections, texture mapping and procedural texture generation.

The set of pixels are then output to the raster operations and storage unit 235. The raster operations unit 235 integrates the set of pixels output from the fragment processing unit 230 with the rendered image. Pixels can be blended or masked with pixels previously written to the rendered image. Depth buffers, alpha buffers, and stencil buffers can also be used to determine the contribution of each incoming pixel, if any, to the rendered image. The combination of each incoming pixel and any previously stored pixel values is then output to a frame buffer, stored for example in display memory 140, as part of the rendered image.

Figure 3:
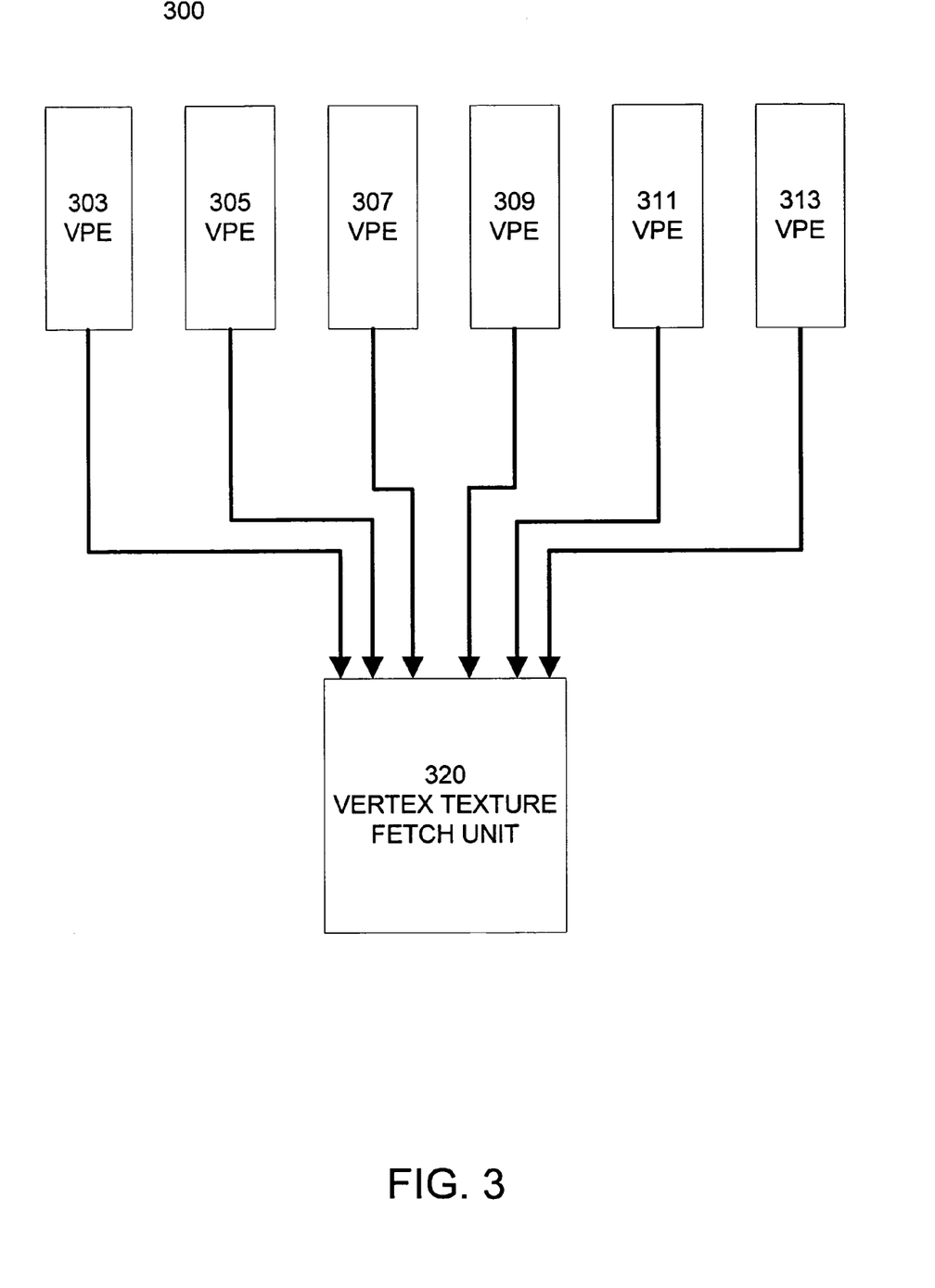
FIG. 3 illustrates a portion of the vertex processing unit according to an embodiment of the invention.

FIG. 3 illustrates a portion 300 of the vertex processing unit according to an embodiment of the invention. Portion 300 includes vertex processing engines 303, 305, 307, 309, 311, 313. Each vertex processing engine can independently execute a vertex shader program. As discussed above, each vertex processing engine executes its vertex shader program and successively processes vertices and their associated attributes to implement a per-vertex algorithm. The per-vertex algorithm can be used to perform any combination of a wide variety of lighting, shading, coordinate transformation, geometric, and animation effects.

The use of multiple vertex processing units operating in parallel improves execution performance. In the example of portion 300, there are a total of six vertex processing engines; therefore, portion 300 can simultaneously execute a total of six different vertex shading programs, six instances of the same vertex shading program, or any combination in between. In alternate embodiments, the vertex processing unit can include any number of vertex processing engines. In an additional embodiment, each vertex processing engine is multithreaded, enabling the execution of multiple vertex shading programs.

In the embodiment of portion 300, each vertex processing engine dispatches vertex texture requests to a vertex texture fetch (VTF) unit 320. Each vertex processing engine dispatches a vertex texture requests to the VTF unit 320 when its vertex shader program includes an instruction to access data from an array. A vertex texture request includes a set of attributes used to locate the requested data. In an embodiment, these attributes include one or more texture coordinates (depending upon the number of dimensions in the vertex texture map), texture ID, and a texture level of detail (LOD). Here, the one or more texture coordinates represent index value(s) specifying a location of vertex texture map data within a vertex texture map. In a further embodiment, these attributes also include a thread ID specifying the execution thread of the vertex processing engine requesting data from a vertex texture map. All of these attributes can be expressed in any numerical format, including integer, fixed-point, and floating-point formats.

Figure 4:
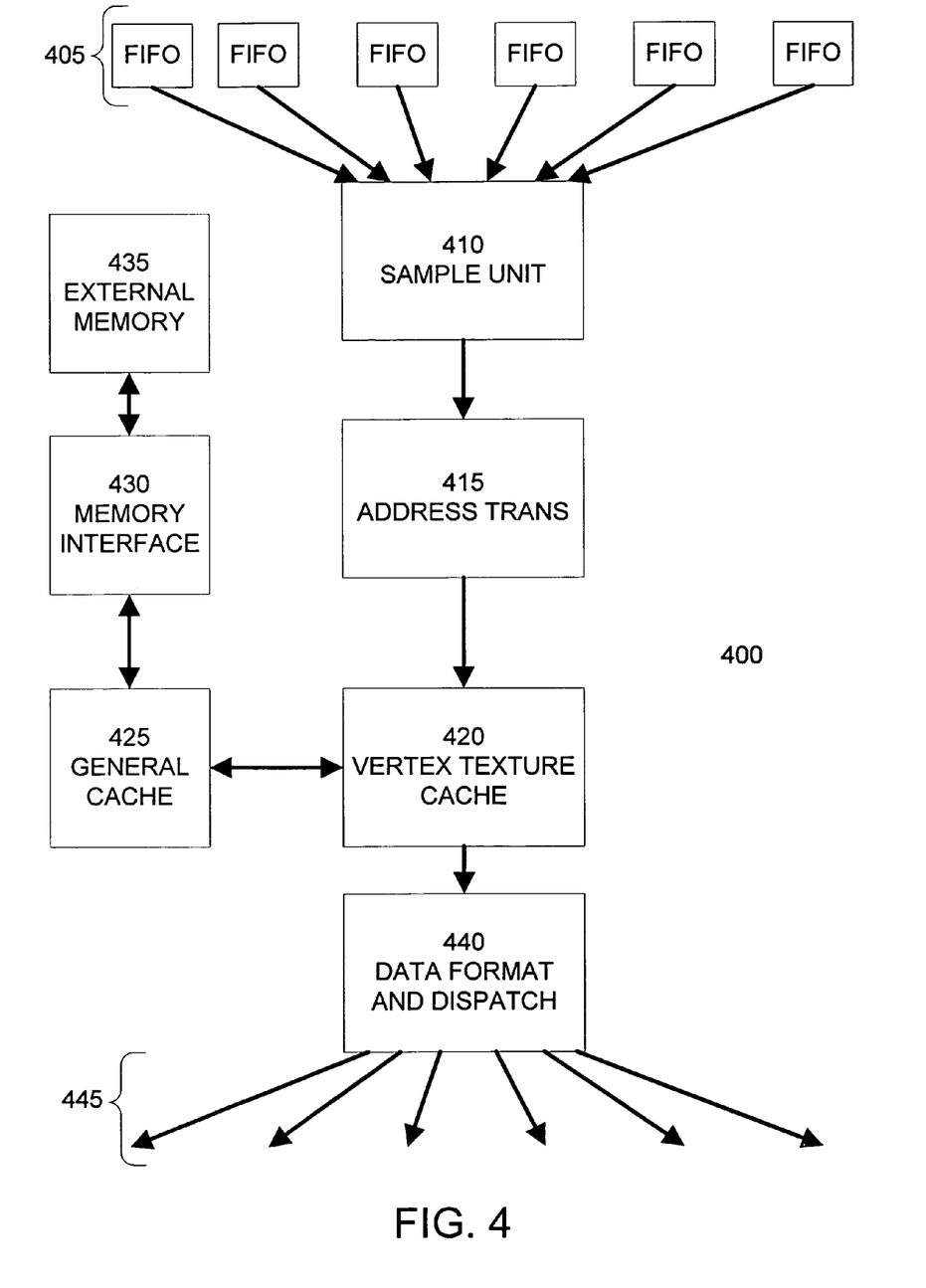
FIG. 4 illustrates a vertex texture fetch unit according to an embodiment of the invention.

FIG. 4 illustrates a vertex texture fetch (VTF) unit 400 according to an embodiment of the invention. VTF unit 400 includes a set of input buffers 405, in an embodiment each of which receives vertex texture requests from one of vertex processing engines. Sample unit 410 reads vertex texture requests from each of the set of input buffers 405 in turn, for example in a round-robin manner. In an embodiment, as the sample unit 410 reads a vertex texture request from one of the set of input buffers 405, it assigns a vertex processing engine ID to the request, so that once the request is completed, the data is returned to the correct vertex processing engine.

Using the texture ID of the vertex texture request, the sample unit 410 retrieves texture state information associated with the requested vertex texture map. Texture state information includes a base memory address for the vertex texture map, the number of dimensions of the vertex texture map, the size of each dimension of the vertex texture map, the format of the data in the vertex texture map (for example, scalar or vector), and texture boundary conditions (for example, when texture coordinates fall outside the vertex texture map, the texture coordinates can be clamped at the boundary, mirrored, or wrapped around to the other side of the vertex texture map). It should be noted that the VTF unit 400 can retrieve data from vertex texture maps of any arbitrary size, rather than being limited to textures with dimensions that are powers of two.

Using the texture coordinates and LOD value included in the vertex texture request and the texture state information, the sample unit 410 calculates a memory address for the data requested by the vertex texture request. This calculation is analogous to that used to calculate a memory address of an array element from a set of one or more array indices. For example, a memory address for data in a two-dimensional vertex texture map is calculated by multiplying the texture width by one of the texture coordinates and adding the result to the other texture coordinate to calculate a first offset value. The LOD value is used to determine a second offset value. The first and second offset values are then added to the texture base address to calculate the memory address for the requested vertex texture data.

The memory address calculated by sample unit 410 is processed by address translation unit 415. Address translation unit 415 manipulates the memory address so that it corresponds with a physical memory address.

The physical memory address from address translation unit 415 is sent to vertex texture cache unit 420. Vertex texture cache unit 420 includes a cache memory for storing recently accessed vertex texture map data. In an embodiment, unit 420 forms a cache tag value from the physical memory address. The cache tag may be formed from higher-order bits of the physical memory address. For example, the tag may be the top 27-bits of a physical memory address. Each entry of the cache memory of unit 420 stores recently accessed vertex texture map data and a tag value used to identify the memory address where the data is stored in memory. If the tag value associated with the vertex texture request matches any of the tag values stored in the cache memory of cache unit 420 (referred to as a cache hit), the corresponding vertex texture map data value is output from the vertex texture cache unit. Conversely, if the tag value associated with the vertex texture request does not match any of the tag values stored in the cache memory of unit 420 (referred to as a cache miss), then the vertex texture request is dispatched to the general cache 425.

General cache 425 is a cache memory for the entire rendering pipeline and stores data recently accessed by many different parts of the rendering pipeline, including the vertex processing unit (including but not limited to the texture fetch unit) and the fragment processing unit. General cache 425 uses the tag value in a similar manner as described above. If the tag value of the vertex texture request matches a tag value stored in the general cache 425, then general cache 425 returns the corresponding data value, which in this case is vertex texture map data, back to the vertex texture cache unit 420. Otherwise, if there is a cache miss in general cache 425, the texture request is sent to memory interface 430. Memory interface 430 then retrieves the vertex texture map data from the specified physical memory address in external memory 435, and returns the vertex texture map data back to the vertex texture cache unit 420, which in turn outputs the data. In a further embodiment, data received by the vertex texture cache unit 420 from the general cache 425 or external memory 435 is stored in the cache memory of vertex texture cache unit 420, for example using a least recently used replacement scheme to overwrite vertex texture cache data previously stored.

In an embodiment, vertex texture cache unit 420 does not stall when there is a cache miss. Instead, the vertex texture cache unit 420 dispatches the vertex texture request to the general cache 425. While waiting for a response from the general cache 425 or external memory 435 to this first vertex texture request, the vertex texture cache unit 420 will receive and process the next vertex texture request. If the next vertex texture request is a cache hit, the vertex texture cache unit 420 immediately outputs the corresponding vertex texture map data value, without waiting for the vertex texture map data for the first vertex texture request to be returned from the general cache 425 or external memory 435. If the next vertex texture request is a cache miss, then the vertex texture cache unit 420 dispatches this request to the general cache 425 as well.

The vertex texture cache unit 420 repeats this operation for additional vertex texture requests. As vertex texture map data is returned from the general cache 425 or external memory 435, the vertex texture cache unit 420 outputs the data. It should be noted that this embodiment of the vertex texture cache unit 420 may output vertex texture map data in a different order than the vertex texture requests are received, with the output order depending on the latency of the general cache 425 and/or external memory 435 and whether cache misses and cache hit are interleaved. This embodiment of the vertex texture cache unit 420 is discussed in detail below.

Vertex texture map data output by vertex texture cache unit 420, regardless of whether it was retrieved from the cache memory of vertex texture cache unit 420, the general cache 425, or external memory 435, is sent to data format and dispatch unit 440. Data format and dispatch unit 440 formats the vertex texture map data to match the format specified by the vertex texture request. In an embodiment, if the vertex texture request specifies a scalar value, x, then data is formatted as (x, 0, 0, 1). Conversely, vector data, (x, y, z, w), is left unchanged. The data format and dispatch unit 440 then examines the vertex processing engine ID associated with the vertex texture request and dispatches the formatted vertex texture map data and its thread ID, which is carried over from the associated vertex texture request, to the appropriate vertex processing engine. In one embodiment, returned data such as the formatted vertex texture map data is transferred from dispatch unit 440 to appropriate vertex processing engines through the use of one or more FIFO units (not shown), which allow more than one set of returned data to be stored and made available for a particular vertex processing engine.

Figure 5:
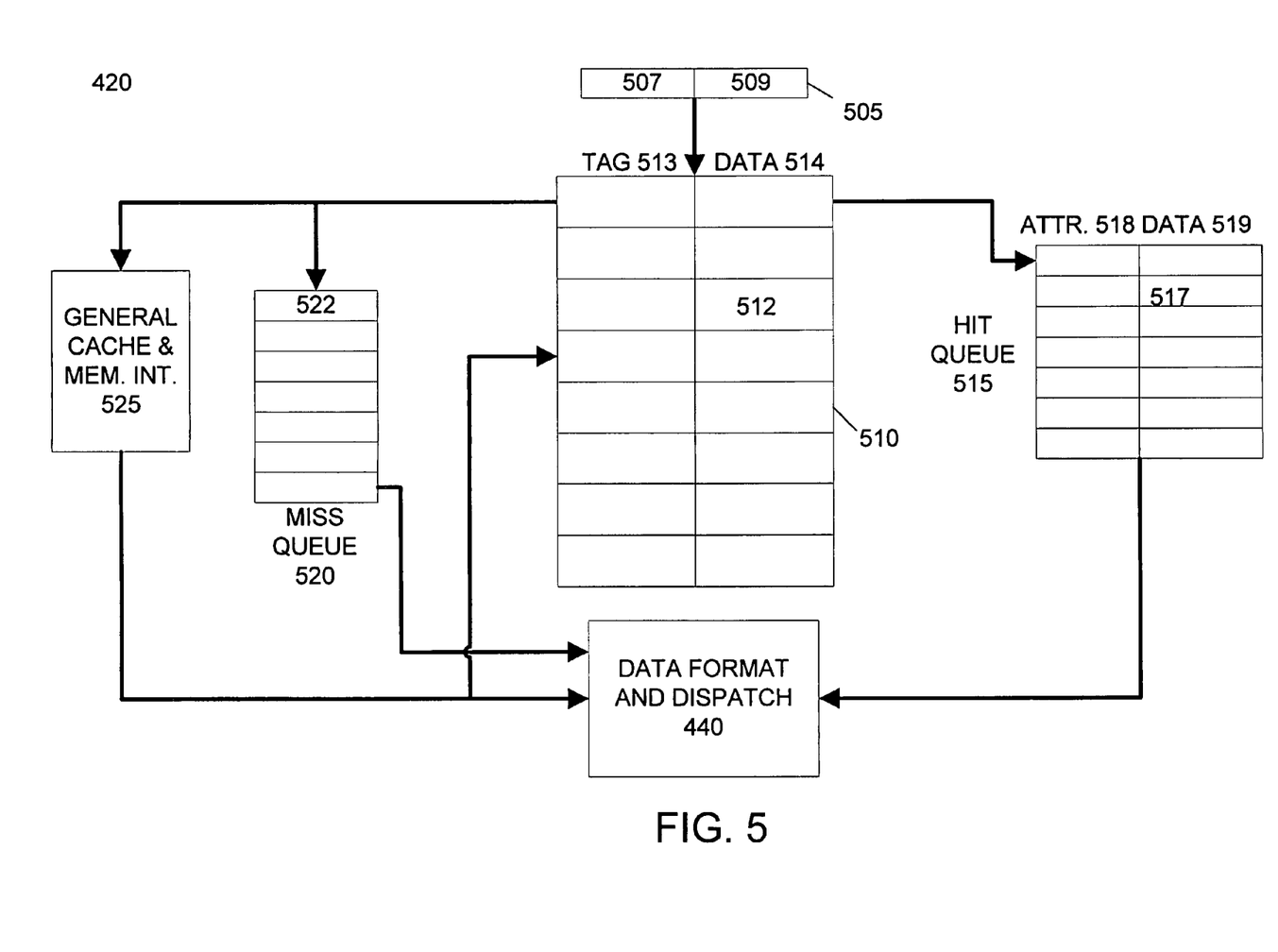
FIG. 5 illustrates a vertex texture cache unit used by a vertex texture fetch unit according to an embodiment of the invention.

FIG. 5 illustrates a vertex texture cache unit 420 used by a vertex texture fetch unit 400 according to an embodiment of the invention. A vertex texture request 505 including a set of attributes 507 and tag 509 is sent from the address translation unit 415 to the vertex texture cache unit 420. The set of attributes 507 includes data to be used to return vertex texture map data retrieved by the vertex texture fetch unit 400 to the appropriate vertex processing engine. The set of attributes 507 can include the vertex processing engine ID and thread ID previously associated with the vertex texture request. Additionally, the set of attributes can include formatting information to be used by the data format and dispatch 440.

As discussed above, the vertex texture cache unit 420 includes a cache memory 510. The cache memory includes a number of cache lines. Each cache line, such as example cache line 512, includes a tag portion 513 and a data portion 514. The vertex texture cache unit 420 compares the tag 509 associated with an incoming vertex texture request 505 to the tag portion 513 of each of the cache lines in the cache memory 510. If the tag 509 matches the tag portion of one of the cache lines of the cache memory 510, then the vertex texture map data requested by the vertex texture request 505 has previously been retrieved and stored by the vertex texture fetch unit 400. Accordingly, the data portion of the matching cache line, which contains the vertex texture map data requested by the vertex texture request, is output by the cache memory 510.

In an embodiment, the vertex texture map data output from the cache is stored in the hit queue 515. Additionally, the set of attributes 507 associated with the vertex texture request 505 are also stored in the hit queue 515. In an embodiment, hit queue 515 is a first-in/first-out buffer (FIFO) having a number of buffer lines. Each buffer line, for example line 517, includes a data portion 519 and an attribute portion 518. For each cache hit, the vertex texture map data and its associated set of attributes 507 are stored together in a buffer line of hit queue 515. As discussed in detail below, the data format and dispatch unit 440 reads the vertex texture map data and its associated set of attributes from buffer lines of the hit queue 515.

Returning to the cache memory 505, if the tag data 509 does not match the tag portion of one of the cache lines of the cache memory 510, then the vertex texture map data requested by the vertex texture request 505 has previously not been retrieved and stored by the vertex texture fetch unit 400. Accordingly, the vertex texture request 505 is dispatched to the general cache and memory interface 525. As discussed above, the general cache and memory interface will determine whether the vertex texture map data requested by the vertex texture request has been stored in the general cache 425, and if not, further dispatch the vertex texture request to the memory interface 430 to retrieve the vertex texture map data from the external memory 435.

In addition to dispatching the vertex texture request 505 to the general cache and memory interface 525, the cache memory 510 also stores the set of attributes 507 associated with the vertex texture request 505 in miss queue 520. Regardless of whether the vertex texture request 505 has resulted in a cache miss or a cache hit, once the cache memory 510 has processed the vertex texture request 505, the cache memory 510 can immediately receive and process a subsequent vertex texture request, outputting additional vertex texture map data or dispatching the subsequent vertex texture request to the general cache and memory interface 525 as described above.

As the vertex texture fetch unit 400 can receive and process vertex texture requests from a number of vertex processing engines, the miss queue 520 is used to keep track of the set of attributes associated with each pending vertex texture request. Upon vertex texture map data being returned to the vertex texture cache unit 420, either from the general cache 425 or from external memory 435, the miss queue 520 matches the vertex texture map data with the corresponding set of attributes.

In an embodiment, the general cache and memory interface 525 returns vertex texture map data in the same order that it receives vertex texture requests. In this embodiment, the miss queue 520 is a FIFO having a number of buffer lines, such as buffer line 520. When the vertex texture request is dispatched to the general cache and memory interface 525, the associated set of attributes is stored in the appropriate line of miss queue 520. As the vertex texture map data is returned to the vertex texture cache unit in the same order that the corresponding vertex texture request is dispatched, when the vertex texture map data is returned, the associated set of attributes will be at the front of the miss queue 520.

As vertex texture map data is returned to the vertex texture cache unit 420, the vertex texture map data is stored in the cache memory 510. In an embodiment, the cache memory 510 uses a least recently used replacement scheme to store vertex texture map data. The vertex texture cache unit 420 overwrites the least recently used cache line of the cache memory 510 with the returned vertex texture map data. In a further embodiment, the miss queue 520 also stores the tag associated with each vertex texture request, and when the corresponding vertex texture map data is returned to the vertex texture cache unit 420, the tag is written to the least recently used cache line along with the vertex texture map data. In a further embodiment, the least recently used cache line of the cache memory 510 is determined when the vertex texture map data is returned to the vertex texture cache unit 420, rather than at the time the corresponding vertex texture request is dispatched to the general cache and memory interface 525.

The data format and dispatch unit 440 receives vertex texture map data and the associated attributes from both hit queue 515 and the combination of the general cache and memory interface 525 and the miss queue 520. In an embodiment, vertex texture cache unit 420 sends vertex texture map data and associated attributes to the data format and dispatch unit 440 from the hit queue 515 until the hit queue 515 is empty or until vertex texture map data is received from the general cache and memory interface 525. When vertex texture map data is received from the general cache and memory interface 525, the vertex texture cache unit 420 retrieves the associated set of attributes from the miss queue 520 and sends the combination to the data format and dispatch unit 440. Because the vertex texture cache unit 420 continues to process and output vertex texture map data from cache hits while cache misses for vertex texture requests are pending, vertex texture map data is output from the vertex texture cache unit in a different order than the corresponding vertex texture requests are received. However, because the vertex texture cache unit maintains the association between vertex texture map data and its set of attributes, the data format and dispatch unit 440 will format the data correctly and return it to the appropriate vertex processing engine.

The vertex texture cache unit described above enables vertex shader programs to arbitrarily access array data while minimizing pipeline stalls due to memory latency. First, the vertex texture cache unit stores frequently accessed vertex texture map data. When a cache miss occurs, the vertex texture cache unit can continue to process subsequent vertex texture requests while data is being retrieved from memory for the cache miss. Furthermore, the vertex texture cache unit maintains the association between vertex texture request attributes and the corresponding vertex texture map data, so that regardless of the order that vertex texture requests are fulfilled, the vertex texture map data is returned to the requesting vertex processing engine in the correct format.

This invention enables a vertex processing unit of a graphics processing subsystem to execute vertex shader programs that arbitrarily access array data while minimizing the occurrence and impact of pipeline stalls due to memory latency. Although the invention has been described with reference to several example vertex shader programs, the invention may be used to execute vertex shader programs accessing data in arbitrary memory locations for any purpose. The invention has been discussed with respect to specific examples and embodiments thereof; however, these are merely illustrative, and not restrictive, of the invention. While the present invention has been described in terms of specific embodiments, it should be apparent to those skilled in the art that the scope of the present invention is not limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A graphics processing subsystem comprising:
 a vertex texture fetch unit adapted to receive a series of vertex texture requests from at least one vertex processing engine, each vertex texture request including a vertex texture ID specifying a vertex texture map and at least one index value specifying a location of vertex texture map data within the vertex texture map, the vertex texture fetch unit comprising:
 a sample unit adapted to compute a memory address for each vertex texture request, the memory address corresponding to the location of the vertex texture map data within a graphics memory; and
 a vertex texture cache unit including a vertex texture cache memory adapted to store a copy of at least a portion of at least one vertex texture map, the vertex texture cache unit adapted to request the vertex texture map data specified by a first one of the series of vertex texture requests from the location in the graphics memory corresponding with the memory address in response to a determination by the vertex texture cache unit that a vertex texture cache memory is not storing a copy of the vertex texture map data;
 wherein, while the request for vertex texture map data specified by a first one of the series of vertex texture requests from the graphics memory is pending, the vertex texture cache unit is adapted to output a vertex texture map data corresponding with a second one of the series of vertex texture requests.

2. The graphics processing subsystem of claim 1, wherein the second one of the series of vertex texture requests follows the first one of the series of vertex texture request.

3. The graphics processing subsystem of claim 2, wherein the vertex texture cache unit is adapted to output the vertex texture map data corresponding with a second one of the series of vertex texture requests in response to the vertex texture cache memory having stored a copy of the vertex texture map data corresponding with a second one of the series of vertex texture requests.

4. The graphics processing subsystem of claim 3, wherein the vertex texture cache unit includes a hit queue adapted to store a set of attributes included with the second one of the series of vertex texture requests in association with a further copy of the vertex texture map data corresponding with the second one of the series of vertex texture requests.

5. The graphics processing system of claim 1, wherein the second one of the series of vertex texture requests precedes the first one of the series of vertex texture request.

6. The graphics processing subsystem of claim 5, wherein the vertex texture cache unit is adapted to output the vertex texture map data corresponding with the second one of the series of vertex texture requests in response to receiving the vertex texture map data corresponding with a second one of the series of vertex texture requests from the graphics memory.

7. The graphics processing subsystem of claim 6, wherein the vertex texture cache unit is adapted to match the received vertex texture map data with a set of attributes included with the second one of the series of vertex texture requests.

8. The graphics processing subsystem of claim 7, wherein the vertex texture cache unit includes a miss queue adapted to store a set of attributes included with the second one of the series of vertex texture requests while a request for the vertex texture map data corresponding with the second one of the series of vertex texture requests is pending.

9. The graphic processing subsystem of claim 7, wherein the set of attributes includes a formatting value specifying a data format.

10. The graphics processing subsystem of claim 9, further including a data formatting unit adapted to receive vertex texture map data and a set of attributes from the vertex texture cache unit and to format the vertex texture map data in accordance with the formatting value.

11. The graphics processing subsystem of claim 9, further including a dispatch unit adapted to receive vertex texture map data and a set of attributes from the vertex texture cache unit and to dispatch the vertex texture map data to the one of the plurality of vertex processing engines specified by the vertex processing engine ID.

12. The graphics processing subsystem of claim 7, wherein the set of attributes includes a vertex processing engine ID specifying one of a plurality of vertex processing engines to receive vertex texture map data corresponding with the second one of the series of vertex texture requests.

13. The graphics processing subsystem of claim 7, wherein the set of attributes includes a thread ID specifying one of a plurality of vertex shader programs to receive vertex texture map data corresponding with the second one of the series of vertex texture requests.

14. The graphics processing subsystem of claim 1, wherein the vertex texture cache memory includes a plurality of cache lines, each cache line including a data portion adapted to store a copy of vertex texture map data and a tag portion adapted to store a tag value corresponding to a memory address associated with the vertex texture map data; and
wherein the vertex texture cache unit is further adapted to compare the memory address associated with the first one of the series of vertex texture requests with the plurality of tag values stored in the vertex texture map cache memory to determine that the vertex texture cache memory is not storing a copy of the vertex texture map data.

15. The graphics processing subsystem of claim 14, wherein in response to receiving the vertex texture map data corresponding with a second one of the series of vertex texture requests from the graphics memory, the vertex texture cache unit is adapted to store a copy of the vertex texture map data corresponding with a second one of the series of vertex texture requests in one of the plurality of cache lines.

16. The graphics processing subsystem of claim 15, wherein the vertex texture cache unit is adapted to store the copy of the vertex texture map data corresponding with a second one of the series of vertex texture requests in a least recently used one of the plurality of cache lines.

17. The graphics processing subsystem of claim 1, further comprising a graphics memory adapted to store graphics data including a vertex texture map including the vertex texture map data.

18. A method for retrieving vertex texture map data, the method comprising:
receiving a first vertex texture request including a memory address corresponding to the location of a first vertex texture map data within a graphics memory;
evaluating the memory address to determine if a vertex texture cache memory is storing a copy of the first vertex texture map data is stored in a vertex texture cache memory;
in response to determining that the vertex texture cache memory is storing a copy of the first vertex texture map data, outputting the copy of the first vertex texture map data and a set of attributes associated with the first vertex texture request; and
in response to determining that the vertex texture cache memory is not storing a copy of the first vertex texture map data, dispatching the first vertex texture request to a general data cache and storing the first set of attributes associated with the first vertex texture request, and further repeating the steps of receiving, evaluating, outputting, dispatching and storing for a second vertex texture request while the first vertex texture request is being processed by the general data cache.

19. The method of claim 18, further including:
in response to dispatching the first vertex texture request to the general data cache:
receiving the first vertex texture map data from the general data cache;
matching the first vertex texture map data with the first set of attributes associated with the first vertex texture request; and
outputting the first vertex texture map data and the first set of attributes.

20. The method of claim 19, further including:
in response to receiving the first vertex texture map data from the general data cache, storing a copy of the first vertex texture map data in the vertex texture cache memory.

21. The method of claim 20, further including:
storing the copy of the first vertex texture map data in a least recently used one of a plurality of cache lines included in the vertex texture cache memory.

22. The method of claim 18, wherein the first set of attributes includes a formatting value specifying a data format.

23. The method of claim 18, wherein the first set of attributes includes a vertex processing engine ID specifying one of a plurality of vertex processing engines to receive the first vertex texture map data.

24. The method of claim 23, further including dispatching the first vertex texture map data to the one of the plurality of vertex processing engines specified by the vertex processing engine ID.

25. The method of claim 18, wherein the first set of attributes includes a thread ID specifying one of a plurality of vertex shader programs to receive the first vertex texture map data.

* * * * *